J. V. GUDMAND-HOYER.
METHOD OF TRUING GEARS.
APPLICATION FILED JAN. 23, 1914.
1,111,064.
Patented Sept. 22, 1914.
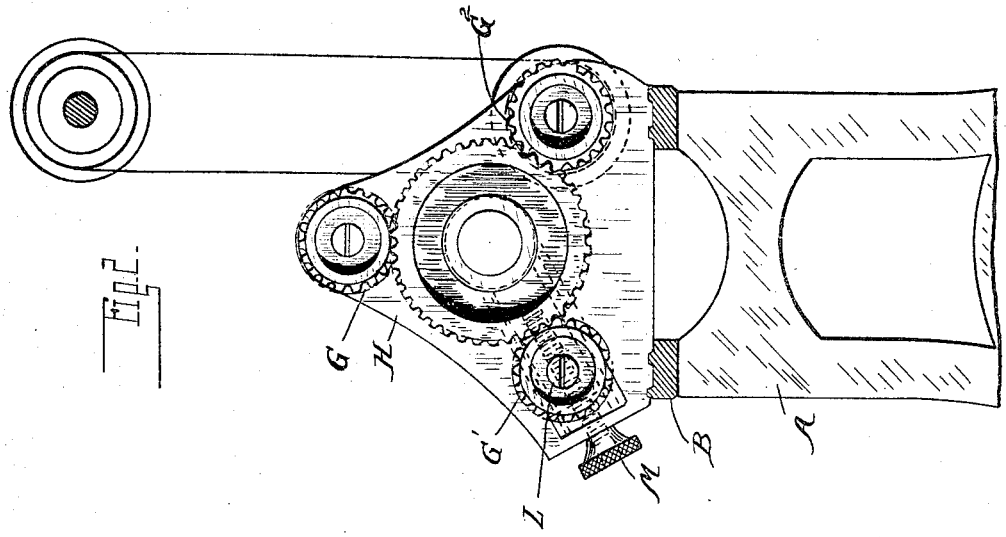
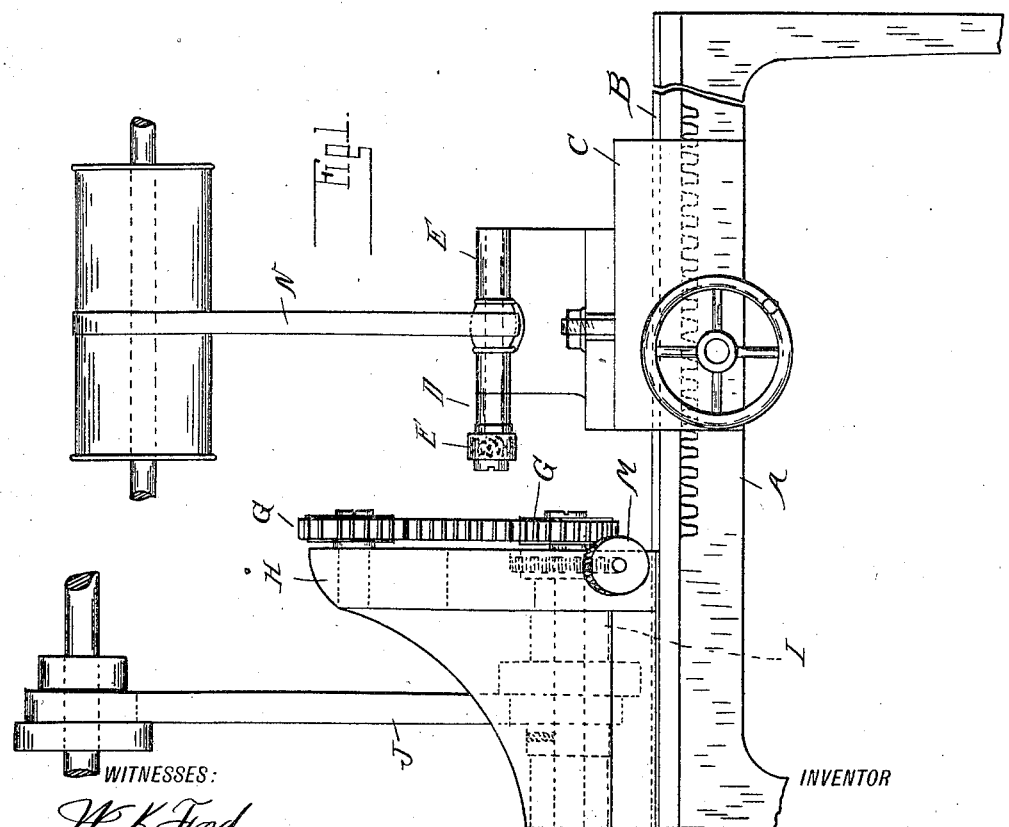
WITNESSES:
W. K. Ford
James P. Barry
INVENTOR
Julius V. Gudmand-Hoyer
BY
Whittemore Hulbert & Whittemore
ATTORNEYS

UNITED STATES PATENT OFFICE.

JULIUS V. GUDMAND-HOYER, OF DETROIT, MICHIGAN, ASSIGNOR OF ONE-HALF TO HARLEY H. LA VERCOMBE, OF DETROIT, MICHIGAN.

METHOD OF TRUING GEARS.

1,111,064.  Specification of Letters Patent.  Patented Sept. 22, 1914.

Application filed January 23, 1914. Serial No. 813,931.

*To all whom it may concern:*

Be it known that I, JULIUS V. GUDMAND-HOYER, a subject of the King of Denmark, residing at Detroit, in the county of Wayne and State of Michigan, have invented certain new and useful Improvements in Methods of Truing Gears, of which the following is a specification, reference being had therein to the accompanying drawings.

The invention relates to the manufacture of hardened gears, and it is the object of the invention to minimize the defects or inaccuracies resulting from the tempering or hardening process.

In the present state of the art gears are usually cut from the soft or annealed metal and are subsequently hardened by heating and chilling, or tempering in the usual way. Inasmuch, however, as the metal often changes shape during this process, the hardened gears are no longer true but are more or less eccentric to their original axis. These inaccuracies are not very great in degree, but are sufficient to interfere with the smooth running of the gears and to increase frictional losses to a considerable extent.

With my improved method, the inaccuracies are minimized so as to be negligible by truing the bore of the wheel to be concentric with a plurality of equidistantly distributed points in the periphery. Thus the degree of inaccuracy is divided by two, which ordinarily renders it too small to be objectionable.

In the drawings: Figure 1 is a side elevation of a machine adapted to carry out my improved process; and Fig. 2 is a cross section thereof.

The characteristic feature of my improved process is the truing of the bore to the warped or distorted periphery, and this is accomplished by revolving the gear while in mesh with a plurality of other gears distributed about its periphery. The bore is then trued by grinding and will consequently be concentric with the average points in the periphery. In detail, A is a suitable bed or frame provided with parallel ways B and a carriage C for traveling thereupon.

D is a grinder arbor mounted in bearings E upon the carriage and having a suitable grinder wheel F adapted to enter the bore of the gear.

The gear to be ground is revolubly held by a plurality of intermeshing gears G preferably three in number and equidistantly distributed about the periphery. These gears are mounted upon a head H, and one is driven by suitable means such as the spindle I driven by the belt J. Another one of the gears, such as G', is mounted upon an adjustable spindle L having the thumbscrew M or other device for altering its radial distance from the axis of the work.

With the construction as described, in operation, the gear to be trued is placed in mesh with the three gears G G' and $G^2$, and the gear G' is adjusted by means of the thumb-screw M, so as to take up lost motion and to hold the work in close mesh with all of the holding gears. Motion is then imparted to the spindle I and gear G thereon, which communicates its rotation to the gear to be ground and the other holding gears G' and $G^2$ intermeshing therewith. Motion is also communicated to the grinder wheel F through a suitable drive connection such as N. The operator then adjusts the carriage C, as by means of the feed wheel O to pass the grinder wheel F into the bore of the gear to be ground, thereby truing the latter. When the operation is complete the gear under treatment may be quickly removed and another one engaged for a similar operation.

What I claim as my invention is:

1. The method of truing gears, comprising the holding and centering a gear by a series of gears in mesh therewith distributed about its periphery, driving one of said gears to impart rotary motion to the supported gear, and truing the bore of the supported gear during rotation thereof.

2. The method of truing gears, comprising the supporting of the gear in mesh with a series of gears distributed about its periphery, adjusting one of said gears to take up all lost motion, rotating one of said gears to impart similar movement to all of the gears, and truing the bore of the supported gear during rotation thereof.

In testimony whereof I affix my signature in presence of two witnesses.

JULIUS V. GUDMAND-HOYER.

Witnesses:
JAMES P. BARRY,
HENRIETTA E. BOWMAN.